United States Patent [19]

Habermann

[11] 4,244,629
[45] Jan. 13, 1981

[54] DEVICE FOR THE HORIZONTAL STABILIZATION OF A VERTICALLY SUPPORTED MASS

[75] Inventor: Helmut Habermann, Vernon, France

[73] Assignee: Societe Europeenne de Propulsion, Puteaux, France

[21] Appl. No.: 873,169

[22] Filed: Jan. 30, 1978

[30] Foreign Application Priority Data

Feb. 4, 1977 [FR] France ................................ 77 03246

[51] Int. Cl.³ ............................................ F16C 39/06
[52] U.S. Cl. ....................................................... 308/10
[58] Field of Search .............................. 308/10; 74/5.7

[56] References Cited

U.S. PATENT DOCUMENTS

| 3,261,210 | 10/1917 | Buchhold | 308/10 |
| 3,642,334 | 2/1972 | Atkinson | 308/10 |
| 3,823,990 | 7/1974 | Gilinson | 308/10 |
| 3,845,995 | 11/1974 | Wehde | 308/10 |
| 3,865,442 | 2/1975 | Studer | 308/10 |
| 3,888,533 | 6/1975 | Wehde | 308/10 |
| 3,937,533 | 2/1976 | Veillette | 308/10 |
| 3,976,339 | 8/1976 | Sabnis | 308/10 |

FOREIGN PATENT DOCUMENTS 2051911  4/1972  Fed. Rep. of Germany ............. 308/10

Primary Examiner—R. Skudy
Attorney, Agent, or Firm—Eyre, Mann, Lucas & Just

[57] ABSTRACT

The invention relates to a device for the horizontal stabilization of a mass supported vertically with the aid of springs, intended for damping the oscillations of the mass in a horizontal plane, for a given vibration frequency band, said device comprising two active electromagnetic radial bearings and at least two accelerometers placed on the mass to be stabilized. The bearings are controlled from signals furnished by the accelerometers which are sensitive to oscillations of the table in two orthogonal horizontal directions.

3 Claims, 3 Drawing Figures

DEVICE FOR THE HORIZONTAL STABILIZATION OF A VERTICALLY SUPPORTED MASS

The present invention relates to a device for the horizontal stabilisation of a mass supported vertically with the aid of springs, intended for damping the oscillations of said mass in a horizontal plane for a given frequency band.

For high-precision work, a base support or table is often required having a sensitivity to vibrations which is as low as possible. In industry, the strongest vibrations, produced essentially by rotating machines, are generally at a frequency close to 25 Hz. In order to reduce the influence of these vibrations, it has been proposed to produce relatively heavy plates mounted on springs, so as to constitute an inertial support system, the frequency of which is between about 3 and 4 Hz. Such a system which preferably does not comprise a damper, presents a much reduced transmissibility for the frequencies close to 25 Hz or 50 Hz and makes it possible to become free of the major part of the vibrations produced in industrial circles. However, the transmissibility remains very high for frequencies close to the resonance frequency of the system, i.e. for frequencies of the order of 3 to 4 Hz, and, when a highly stable machine is to be produced, where very low amplitude vibrations, for example of the order of a micron must be able to be damped, the use of conventional dampers cannot be envisaged. Thus, the conventional means for suspending and damping a large mass, when they are provided to be free of vibrations of frequencies close to a few tens of hertz, remain inefficient with respect to the very low frequency disturbances, which are essentially produced in horizontal directions.

It is a precise object of the present invention to produce a stabilising device which makes it possible to free a horizontal element with vertical inertial support from the vibrations which may be produced at very low frequency, i.e. a device allowing a stiffness and damping of said element for very low frequencies, in particular lower than about a hundred hertz and higher than a few tenths or hundredths of hertz.

This aim is attained due to the fact that the above-mentioned stabilising device comprises, in accordance with the invention, first and second active electromagnetic radial bearings, each comprising, in manner known per se, armature windings mounted on a stationary armature cooperating with a ring armature disposed opposite said stationary armature, the axis of each of the bearings being vertical, each of the armature assemblies being fast with a frame and the ring armature of the first bearing being fast with a first end of said mass to be stabilised, whilst the ring armature of the second bearing is fast with a second end of the mass to be stabilised; at lest one first and one second accelerometer disposed on the mass to be stabilised to detect oscillations along a first and a second horizontal axis, respectively, said accelerometers delivering respectively a first and a second signal in response to oscillations whose frequency is included within the pass band of the accelerometers; and a control circuit to which are applied said first and second signals, and which is connected to the windings of the electromagnetic radial bearings to ensure a stabilisation of the movements of the mass to be stabilised.

Thus, for the frequency band corresponding to the pass band of the accelerometers, the element to be stabilised is controlled in space, the accelerometers delivering signals, which, after double integration in the control circuits, are applied to the windings of the magnetic bearings which ensure a maintenance in position of the element to be stabilised without introducing viscous friction or a stiffness with respect to the ground, contrary to actuators of the hydraulic or pneumatic type. In fact, the force exerted by the magnetic bearings is decoupled from the ground and remains independent of the vibrations to which the armature assemblies fast with a frame connected to the ground may be subjected.

To compensate not only oscillations in two rectangular transverse directions, but also yawing movements, it is advantageous to employ a stabilising device which further comprises a third accelerometer disposed on the mass to be stabilised at a distance from the first accelerometer to detect oscillations in a direction parallel to said first horizontal axis and to deliver a third signal, and such that said first and third signals are applied respectively on a first and a second input of a comparator circuit to form a differential signal applied to the control circuit connected to the windings of the electromagnetic bearings.

The pass band of the accelerometers is preferably between about a few tenths or hundredths of hertz and about a hundred hertz, i.e. it is advantageous if the frequency band for which the signals issuing from the accelerometers are taken into account by the control circuit for controlling the magnetic bearings, is limited to the values indicated hereinabove. For too low frequency values, lower than a few hundredths of hertz, the shift of the accelerometers becomes in fact prohibitive and the efficiency of the system is reduced.

According to a particular feature of the invention, the stabilising device further comprises detectors for detecting the position of the ring armature of the electromagnetic radial bearings with respect to the respective armature assemblies, said detectors emitting detection signals which are applied to the control circuit connected to the windings of the electromagnetic bearings and contribute to maintaining the mass to be stabilised in a predetermined position when the amplitude of the detection signal exceeds a predetermined value.

In this way, the position detectors connected to the magnetic bearings act so as to return the ring armatures of the bearings into central position with respect to the armature assemblies when the amplitude of the movement is high and when an armature risks coming into contact with the corresponding armature assembly. The position detectors may also act in frequency ranges outside the pass band of the signals issuing from the accelerometers to give the bearings a certain stiffness which may be added to the stiffness of the springs supporting the mass to be stabilised.

It should be noted that, in the range of frequencies where the stabilising device is active, i.e. in the frequency range for which the current passing through the armature assemblies of the magnetic bearings is controlled by the control circuit acting in response to the signals emitted by the accelerometers, the magnetic bearings generally present a considerable spatial stiffness, which ensures a very low transmissibility to the suspension system for the vibrations, and the forces applied at the level of the magnetic bearings are decoupled from the the ground, i.e. independent of the armature assemblies. Consequently, the magnetic bearings may present relatively wide gaps without this harming the efficiency of the system.

The signals emitted by the accelerometers are subjected to a double integration inside the control circuit to communicate a considerable spatial stiffness to the system. However, it is also possible to create certain damping forces by producing a simple integration of the signals issuing from the accelerometers, for a part of the pass band of the stabilising device.

Outside the frequency band where the signals issuing from the accelerometers are taken into account, i.e. where the device for horizontal stabilisation is active, the mass suspended on its springs presents a stiffness calculated conventionally by taking into account the stiffness of the springs and the inertia of the device.

The invention will be more readily understood on reading the following description with reference to the accompanying drawings, in which.

Figure 1:
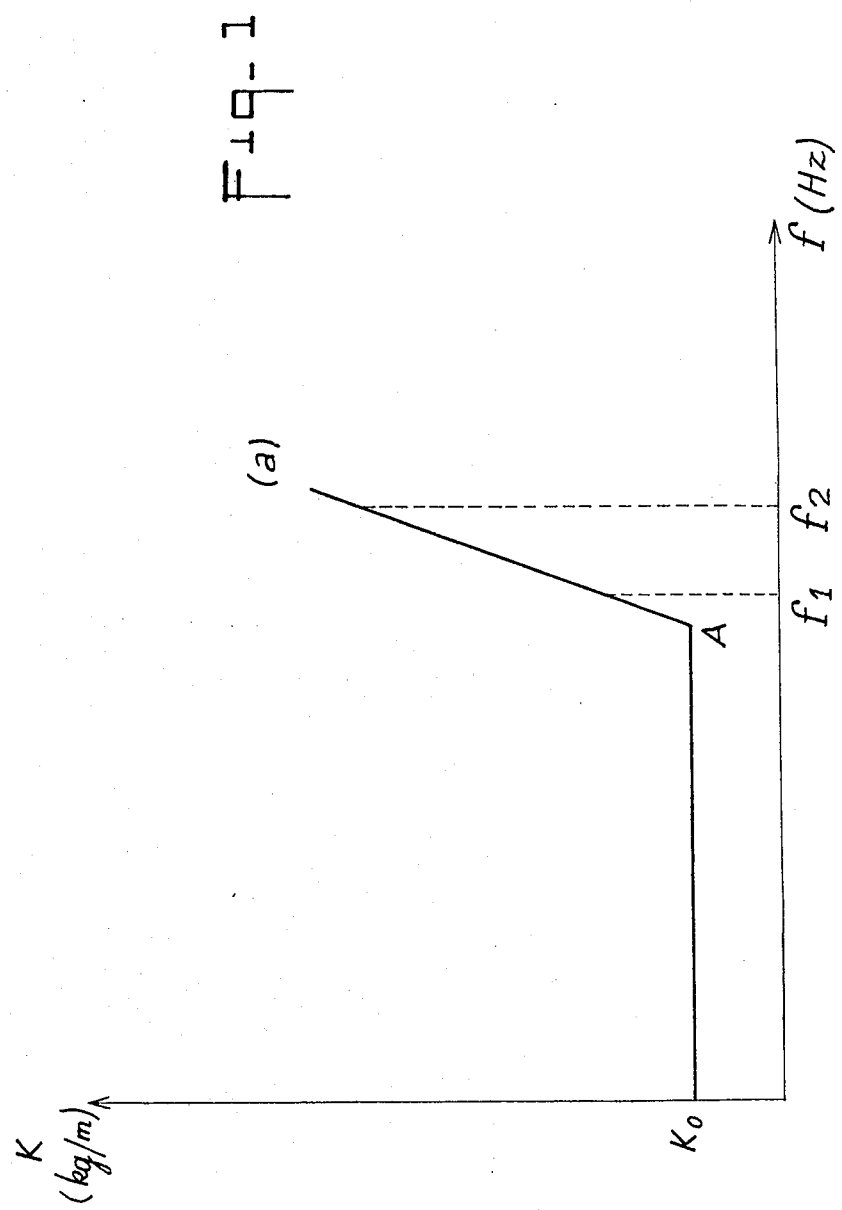
FIG. 1 is a curve representing the stiffness of an element conventionally supported with the aid of springs without the use of the device according to the invention.
Figure 3:
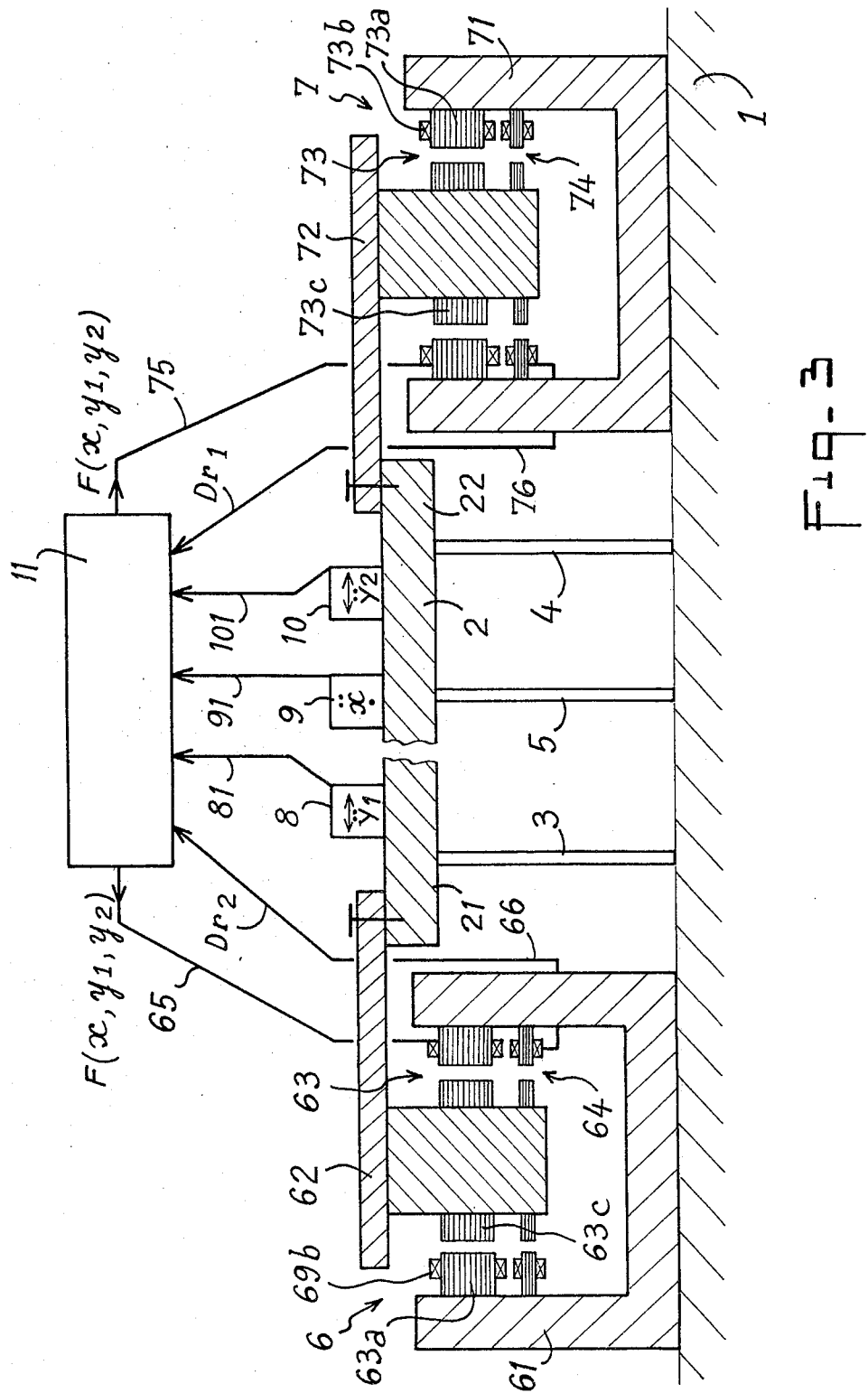
FIG. 3 is a section through an embodiment of the device according to the invention, shown schematically.

Referring now to the drawings, FIG. 1 shows the curve (a) as an asymptotic representation of the stiffness K as a function of the frequency f of a system constituted by a mass M such as the plate 2 of FIG. 3, supported by springs 3, 4, 5 abutting on the ground 1. In the absence of any other auxiliary stabilising device, the stiffness K of the system, as shown in FIG. 1, presents a constant value equal to the stiffness $K_o$ of the springs 3, 4, 5 up to a point A corresponding substantially to the resonance frequency $f_1$ of the system which may for example be of the order of a few hertz, then increases rapidly from point A, the stiffness K then essentially corresponding to the stiffness which the plate of mass M presents. Near the frequency $f_2$, which corresponds to considerable vibrations in industrial circles and may be close for example to 25 Hz, 50 Hz or 100 Hz, the stiffness K is sufficiently strong for the transmissibility of the system for vibrations of frequency close to $f_2$ to be relatively small.

Figure 2:
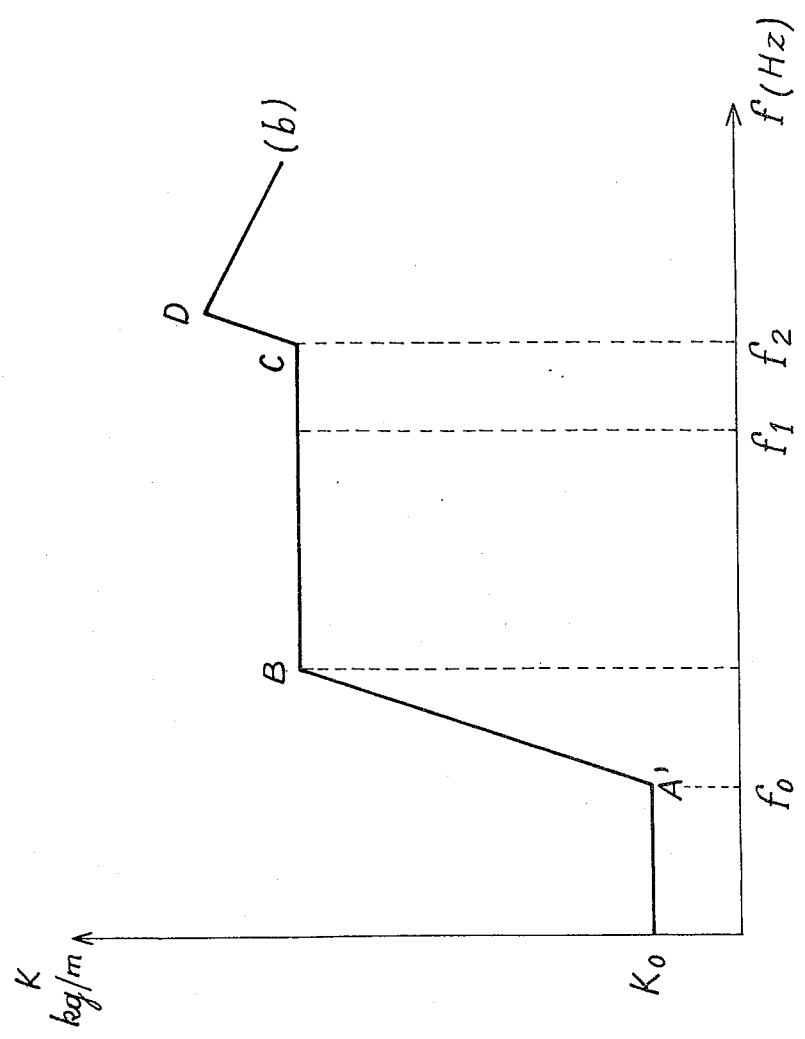
FIG. 2 is a curve representing the stiffness of an element supported with the aid of springs and to which is added a device for horizontal stabilisation according to the invention.

FIG. 2 shows the curve (b) likewise as an asymptotic representation of the stiffness K as a function of the frequency f of the same system constituted by the plate 2 and the spring 3, 4, 5, to which a device for horizontal stabilisation has been added, constituted by the elements 6 to 11 of FIG. 3.

The elements 6 and 7 are assemblies carrying active radial electromagnetic bearings, each comprising a fixed frame 61, 71 respectively, connected to the ground 1 and a piece 62, 72 respectively fast with an end 21, 22 respectively of the plate 2 to be stabilised. The actual electromagnetic bearings 63, 73 comprise an armature assembly, which comprises an armature 63a, 73a and a winding 63b, 73b, and a ring armature 63c, 73c placed opposite the corresponding armature assembly 63a, 63b, 73a, 73b respectively. The ring armature 63c 73c is carried by the piece 62, 72 respectively, whilst the armature assembly 63a, 63b, 73a, 73b is mounted on the fixed frame 61, 71 respectively. It should be noted that the gap between ring armature and armature assembly may be relatively large.

A detector 64, 74 may be added to each radial bearing 63, 73 to determine at each instant the radial position of the ring armature 63c, 73c with respect to the corresponding armature assembly 63a, 63b, 73a, 73b. Such detectors 64 and 74, mounted on the supports 61, 71 near the bearings 63, 73 may or may not be of the electromagnetic type and are of conventional constitution.

Three accelerometers 8, 9, 10 are disposed on the plate 2 to detect the accelerations to which this plate may be subjected further to parasitic vibrations. The accelerometers 8, 9, 10, of conventional type, are provided to function in a band of frequencies included between a frequency substantially lower than $f_1$, for example a frequency of several tenths or hundredths of hertz and a frequency of the order of $f_2$, for example about 100 Hz. The accelerometers 8 and 10 are disposed near each of the ends 21 and 22 respectively, of the plate 2 and are sensitive to accelerations $\ddot{y}_1$, $\ddot{y}_2$ in a direction y. The accelerometer 9 is itself disposed on the plate 2 so as to detect accelerations x in a horizontal direction $\ddot{x}$ perpendicular to direction y.

A control circuit 11, to which are applied, via the conductors 81, 91, 101 respectively, the signals emitted by the accelerometers 8, 9, 10 and via conductors 66, 76, the detection signals emitted by the detectors 64, 74, makes it possible to control the current circulating in the armature windings 63b, 73b of the magnetic bearings 63, 73 and transmitted by the conductors 65, 75. The forces exerted by the armature assemblies of bearings 63,73 on the armatures 63c, 73c are thus controlled from the signals emitted by the accelerometers and may be decoupled from earth.

The signals $\ddot{y}_1$, $\ddot{y}_2$ and $\ddot{x}$ emitted by the accelerometers 8, 10 and 9 are applied in the control circuit 11 to circuits effecting a double integration so as to furnish signals representative of the displacements of the plate 2, the signals $\ddot{y}_1$ and $\ddot{y}_2$ further being likewise applied to a comparator circuit itself connected to a double integrator to furnish a differential signal making it possible to take into account yawing movements in a horizontal plane to which the plate 2 might be subjected under the influence of the vibrations.

For the pass band of the accelerometers, or for a frequency band determined by a filter in the actual control circuit 11 and included in the pass band of the accelerometers, the magnetic bearings 63 and 73 transmit forces independent of the earth 1 and give the system a spatial stiffness. The magnetic bearings 63 and 73 controlled by the accelerometers 8 to 10 thus temporarily create for a predetermined frequency band, forces of horizontal stabilisation in space, of the plate 2, said latter, which may be of heavy mass (several tons), remaining supported vertically by the springs 3, 4 and 5. It should be noted that contrary to hydraulic or pneumatic bearings which would transmit vibrations of frame 61, 71 to the plate 2, the electromagnetic bearings 63, 73 constitute, for the limited frequency band in which they cooperate with the accelerometers 8 to 10, actuators without viscous friction nor any terrestrial stiffness.

The curve (b) of FIG. 2 represents the development of the stiffness of the system shown in FIG. 3, as a function of the frequency, when the stabilising device constituted by the elements 6 to 11 is employed. For every low frequencies, for example clearly lower than 1 Hz, for which the use of accelerometers would cause errors in measurement, only the constant stiffness $K_o$ of the springs 3 to 5 intervenes (portion of the curve (b) terminating at A'), then for a frequency range which may be chosen as a function of the applications envisaged, but which essentially includes the frequency $f_1$ corresponding to the resonance of the mechanical system 2, 3, 4, 5 and advantageously extends to near the above-mentioned frequency $f_2$, the stiffness K corresponds to a considerable spatial stiffness given to the system by the magnetic bearings controlled by accelerometers. After point C of curve (b), the stiffness of the system becomes dependent solely on elements 2, 3, 4, 5 again, as in the case of FIG. 1, and then corresponds, on the portion CD for example, to the stiffness of the plate 2 itself. In this way, the stabilising device according to the invention makes it possible to give the system a considerable stiffness, for a limited period of time, for a determined vibration frequency band $f_0$ to $f_2$.

It is naturally possible also to introduce, in all or part of the frequency band $f_0$ to $f_2$, a spatial damper, by further applying the signals issuing from accelerometers 8 to 10 to simple integrator circuits in the control circuit 11, so that the signals delivered by the circuit 11 also include a damping component.

The detectors 64 and 74 which may be composed of a plurality of detector elements deliver detection signals $Dr_1$ and $Dr_2$ which are a function of the position of the ring armatures 63c and 73c with respect to the bearing armature assemblies fast with the frame 61, 71. The only role of such detectors 64 and 74 is to make it possible to make a correction of the position of the ring armatures with respect to the corresponding armature assemblies if the former present movements of too great amplitude. The signals $Dr_1$ and $Dr_2$ are thus taken into account to contribute to a control of the bearings in the frequency band $f_0$ to $f_2$ with spatial suspension only if they exceed a predetermined value of amplitude. For this, the signals $Dr_1$ and $Dr_2$ are applied inside the control circuit 11 to threshold circuits, the possible output signals of the threshold circuits then being applied to conventional control circuits to furnish output signals having to be applied to the armature windings 63b, 73b. Furthermore, for frequencies lower than $f_0$, the detectors 64, 74 may be used to control the bearings 63, 73, whatever the amplitude of the movements of the armatures 63c 73c, in order to give the bearings a stiffness which is then added to the stiffness $K_0$ of the springs 3 to 5.

Various modifications or additions may of course be made by the man skilled in the art to the device which has just been described solely by way of non-limiting example, without departing from the scope of the invention.

Thus the device for horizontal stabilisation according to the invention may be applied to a mass which is not supported by springs, and may be completed by a device for vertical stabilisation, so that, for a given frequency range, the mass is entirely supported in space and stabilised in six degrees of freedom (three degrees of freedom of translation along three perpendicular axes and three degrees of freedom of rotation about the three axes mentioned).

In such an embodiment with horizontal and vertical stabilisations, the mass to be stabilised is provided with at least two active electromagnetic radial bearings and with three accelerometers in the manner defined hereinabove with reference to FIG. 3, and with at least one supplementary active electromagnetic axial bearing acting along a vertical axis and comprising one or more stationary armature assemblies fast with a frame and an armature disposed opposite the or each armature assembly and fast with the mass to be stabilised. In addition, at least a fourth accelerometer sensitive to oscillations along a vertical axis is disposed on the mass to be stabilised and, in response to oscillations whose frequency is included in its pass band, delivers a signal to control circuits which control the supplementary axial bearing. Any displacement of translation in the vertical sense of the mass to be stabilised may thus be compensated. To be able also to compensate rotations of the mass to be stabilised, about two perpendicular horizontal axes, a fifth and a sixth accelerometer should also be provided, disposed on the mass to be stabilised at a distance from the second and fourth accelerometer respectively to detect oscillations in directions parallel to the axes corresponding to said second and fourth accelerometers and to deliver signals which, combined with the signals furnished respectively by the second and fourth accelerometers, enable the different electromagnetic bearings to be controlled so as to compensate disturbing movements of rotation about horizontal axes.

In the case of a both horizontal and vertical stabilisation system, where the table is not supported by any spring, mechanical means for compensating the constant vertical load exerted by the mass to be stabilised, due to the earth's gravity, must be provided. Such a compensation may advantageously be effected by means of air cushions. In fact, in this way, the mechanical support means are not an obstacle to the supported mass being stabilised in space in six degree of freedom, for a determined frequency range.

What is claimed is:

1. In a suspension system for a mass supported vertically with the aid of springs, a horizontal stabilization device intended for damping the oscillations of said mass in a horizontal plane for a given vibration frequency band comprising:

first and second active electromagnetic radial bearings, each comprising armature windings mounted on a stationary armature cooperating with a ring armature disposed opposite said stationary armature, the axis of each of the bearings being vertical, each of the stationary armature assemblies being rigidly affixed to a frame and the ring armature of the first bearing being rigidly affixed to a first end of said mass to be stabilized and the ring armature of the second bearing being rigidly affixed to a second end of the mass to be stabilized;

at least one first accelerometer and at least one second accelerometer, each said accelerometer adapted to function in a band of frequencies including said given vibration frequency band, said at least one first accelerometer and at least one second accelerometer being disposed on said mass to be stabilized to detect oscillations along a first and a second horizontal axis, respectively, of said mass, said accelerometers delivering a first and second signal, respectively, in response to oscillations whose frequencies are included within said given vibration frequency band; and a control circuit to which are applied said first and second signals, and which is connected to the windings of the electromagnetic radial bearings to ensure a stabilization of the movements of said mass to be stabilized.

2. The device of claim 1, further comprising a third accelerometer disposed on said mass to be stabilized at a distance from the first accelerometer, and wherein said third accelerometer detects oscillations in a direction parallel to said first horizontal axis and delivers a third signal, said first and third signals being applied respectively on a first and second input of a comparator circuit to form a differential signal applied to the control circuit connected to the windings of the electromagnetic bearings.

3. In a suspension system for a mass supported vertically with the aid of springs, a horizontal stabilization device intended for damping the oscillations of said mass in a horizontal plane for a vibration frequency band from approximately several hundredths of a $H_z$ to approximately 100 Hz comprising:

first and second active electromagnetic radial bearings, each comprising armature windings mounted on a stationary armature cooperating with a ring armature disposed opposite said stationary armature, the axis of each of the bearings being vertical, each of the stationary armature assemblies being rigidly affixed to a frame and the ring armature of the first bearing being rigidly affixed to a first end of said mass to be stabilized and the ring armature of the second bearing being rigidly affixed to a second end of the mass to be stabilized;

at least one first accelerometer and at least one second accelerometer, each said accelerometer adapted to function in a band of vibration frequencies from approximately several hundredths of a $H_z$ to approximately 100 $H_z$, said at least one first accelerometer and at least one second accelerometer being disposed on said mass to be stabilized to detect oscillations along a first and a second horizontal axis respectively of said mass, said accelerometers delivering a first and a second signal, respectively, in response to oscillations whose frequencies are included within said band of vibration frequencies; and a control circuit to which are applied said first and second signals, and which is connected to the windings of the electromagnetic radial bearing to provide stabilization of the movements of the mass to be stabilized.

* * * * *